Aug. 23, 1960
S. W. H. PERRY
2,950,084
MOUNTING OF SWIVELLING GUIDE VANE ELEMENTS
IN ELASTIC FLUID MACHINES
Filed Oct. 11, 1954
6 Sheets-Sheet 1
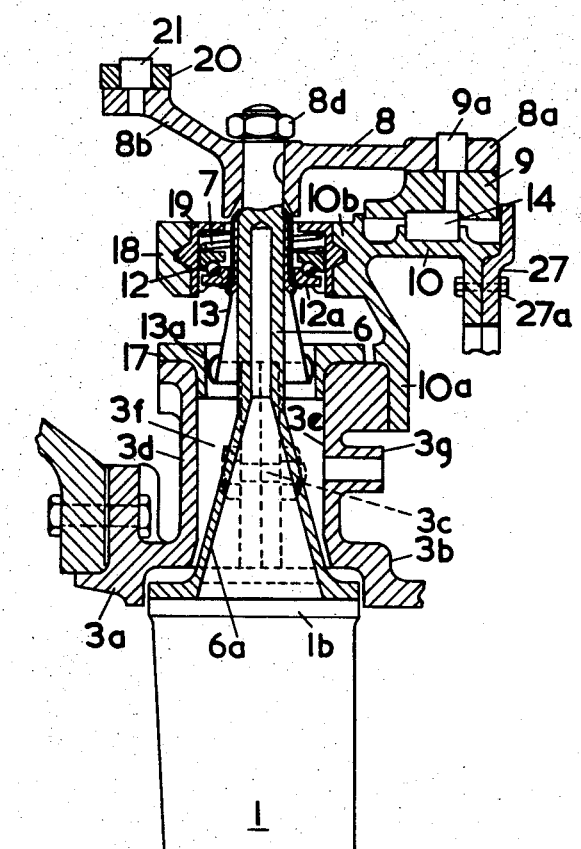
Fig. 1.
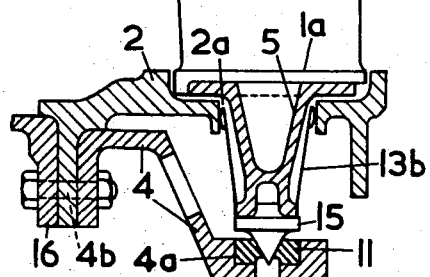
Inventor
Sidney William Henry Perry
By
Stevens, Davis, Miller & Mosher
his Attorneys

United States Patent Office 2,950,084
Patented Aug. 23, 1960

2,950,084

MOUNTING OF SWIVELLING GUIDE VANE ELEMENTS IN ELASTIC FLUID MACHINES

Sydney William Henry Perry, Cove, Farnborough, England, assignor to Power Jets (Research and Development) Limited, London, England, a British company Filed Oct. 11, 1954, Ser. No. 461,601

Claims priority, application Great Britain Oct. 15, 1953

16 Claims. (Cl. 253—78)

This invention relates to swivelling stator guide vanes for elastic fluid turbines and is concerned with a construction particularly suitable for use at the high operating temperatures of gas turbines.

According to the primary feature of the invention a swivelling guide-vane element in an axial-flow turbine is located radially of the turbine by a footstep bearing for the element at the radially inner end of the element. This bearing is screened from the path of the hot working fluid. The radially outer spindle of the element extends beyond the hot gas path to a remotely located outer journal bearing. This radially outer bearing is loaded—e.g. spring loaded—to urge the swivelling element into engagement with the locating footstep. A feature of the invention is a form of bellows used as a torsion or rubbing seal to seal off the radially outer bearing and possibly also the inner footstep from the hot fluid path. Other features will appear from the detailed description which follows, with reference to the accompanying drawings of which:

Fig. 1 is a view of one construction of swivelling stator inlet guide vane with the bearing arrangements in section;

Figure 2:
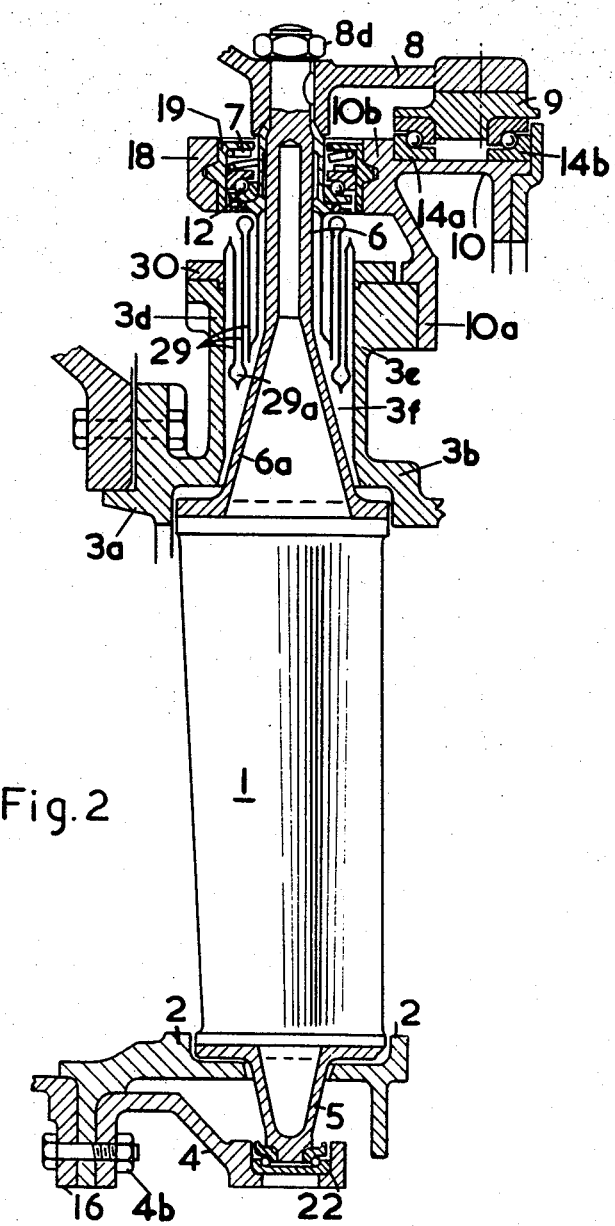
Figs. 2, 3 and 4 are similar views of three modifications.

In Fig. 1 the swivelling stator guide vane 1 is one of a ring of such vanes mounted between a radially inner wall 2 and an outer wall split into halves 3a and 3b. These walls are rings disposed concentrically around the turbine axis; they define the annular gas path between them. Hollow spindle elements 5 and 6 are provided at the inner and outer ends respectively of the vane 1. Spindle 5 can be formed separately from the vane and welded to a flat root 1a on the vane. Spindle 6 can also be formed separately and welded to a flat shroud 1b on the vane tip. The inner wall 2 has holes 2a to pass the spindles 5. Each spindle 5 terminates in a conical pivot 15 of a material such as titanium carbide running in a footstep 11 which may for example be of iron or steel with a nitrided working surface. Attached to but of smaller diameter than the inner wall 2 and concentrically inside it is a bearing support ring 4 having therein a ring of cups 4a which receive the footstep 11. Ring 4 and wall 2 are bolted together and to the annular part 16 of the stationary construction by nuts and bolts 4b.

The elements 3a and 3b abut on a diametral plane and are fastened together by bolts and nuts 3c between adjacent vanes. Each spindle 6 has a conical portion 6a extending through a radial tubular portion defined by half cylindrical walls 3d and 3e on rings 3a and 3b forming a space 3f which can be supplied through inlet 3g with cooling air under pressure. A cylindrical part of spindle 6 passes through a cover ring 17 to a journal bearing—a ball bearing unit 12—which is thus remote from the hot gas path. The bearing 12 has one of its races 12a secured to spindle 6. The split ring element 3b carries the flange 10a of the track member 10 having for each spindle a semi-cylindrical portion 10b to accommodate the ball bearing which is held in place by the usual bearing cap 18 which with the portion 10b forms a bearing housing. This housing is lined by a flanged box 19 which accommodates a loading spring 7 compressed between the flange and the top of the bearing unit 12 to urge the vane 1 bodily towards its inner footstep 11.

The opening in the cover ring 17 from space 3f is sealed against escape of gas or air by a rotary seal consisting of a frusto-conical tube 13 of very thin flexible metal having its smaller end fastened to the spindle 6 and its larger end externally rounded out at 13a to part spherical shape to bear with line contact against the inside surface of the cover ring 17. The gas pressure inside this thin tube 13 distends it to exert sealing pressure on the rubbing surface. This seal of course allows lengthwise and angular movement of the vane. A similar seal 13b is provided for the inner bearing, but may be omitted if the axial loading due to spring 7 holds the vane root 1a and spindle 5 near enough to the inner wall 2 to give a sufficiently small leakage clearance.

Figure 6:
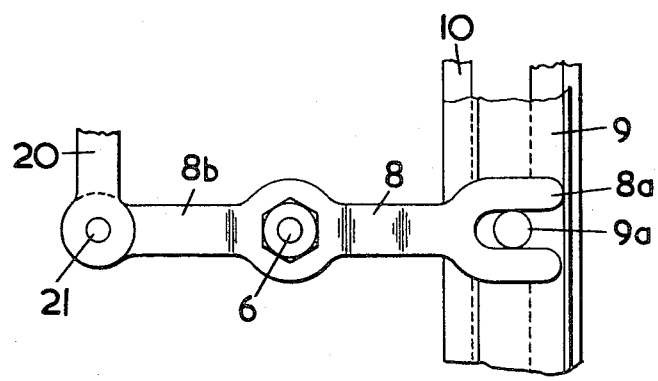
Fig. 6 is part plan view showing an operating lever.

Slidably keyed on the end of spindle 6 beyond the bearing box 19, and held by nut 8d, is the boss of an actuating lever 8. Track 10 is cylindrical, completely enveloping the stator. Around this track can run a ring of rollers 14. An actuating ring 9 is mounted on these rollers 14 for turning around the axis of the turbine, and is retained by retaining ring 27 secured to track 10 by nuts and bolts 27a. Each actuating lever 8 has its arm terminating as seen in Fig. 6 in a fork 8a engaging a pin 9a on the actuating ring 9 which accordingly constrains all the actuating levers 8 to turn together to swivel all the vanes 1. An actuator link 20 whereby the vanes can be swivelled is linked by pivot pin 21 to an extra arm 8b on one of the actuating levers.

Figure 3:
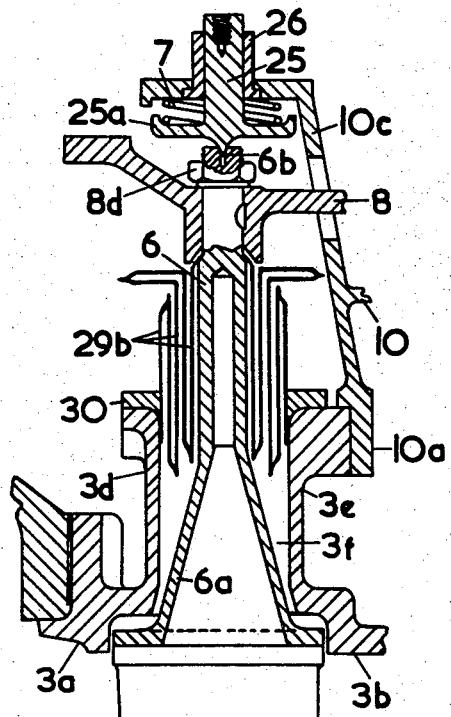
Figure 3:
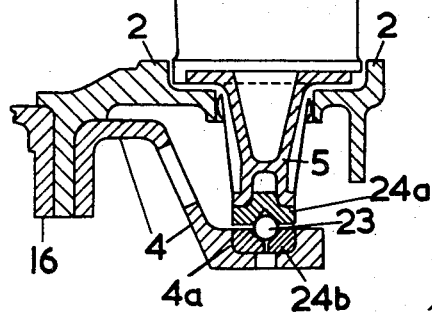
Figure 4:
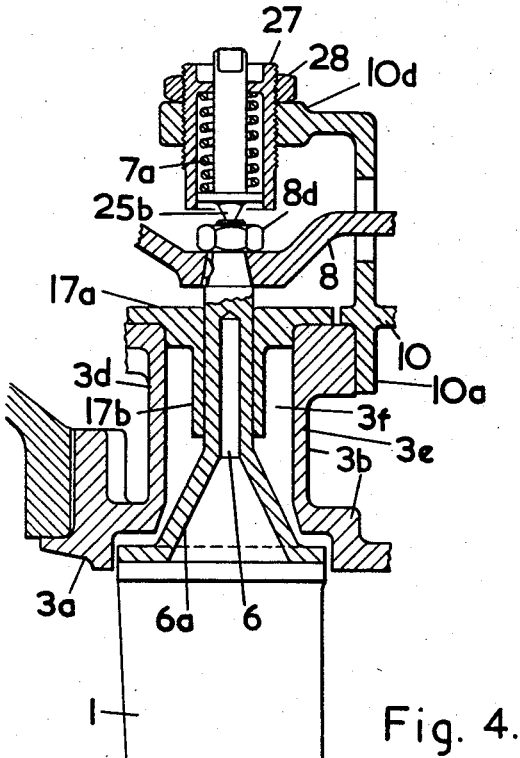

In Figs. 2, 3 and 4 parts 1 to 10 and 20 and 21 are as already described.

These figures however show modified forms of inner footstep, of outer bearing and of seal, as well as one alternative form of track support, which modifications will each be described in turn with reference to these figures. In Fig. 2, as an alternative, the footstep on ring 4 for spindle 5 is a ball thrust bearing unit 22. Fig. 3 shows another alternative wherein the footstep bearing has a single central ball 23—which may be of material such as titanium carbide—between conical seatings 24a on the spindle 5 and 24b in the cup 4a in the bearing support ring 4; the seatings may be nitrided iron or steel.

Fig. 2 shows the outer bearing as in Fig. 1. In Fig. 3 however there is an instrument pivot bearing—i.e. a pivot pin 25 slidable in bush 26 in extension 10c of track 10 and loaded into engagement with the conical seating 6b in the outer end of spindle 6 by loading spring 7 bearing against enlargement 25a. In Fig. 4 the pivot pin 25b is of slightly different shape and the spring 7a smaller in diameter but longer. These are in the spring cup 27 adjustable—for adjusting the spring loading—by being screwed into extension 10d of track 10 and locked by nut 28.

The alternative gas-tight seal shown in Fig. 2 consists of a number of nested thin flexible metal sleeves 29, the inner one secured in gas-tight manner to the spindle 6 and the outer to the cover ring 30, similarly joined to each other at their ends, by bellows—like or equivalent portions 29a giving lengthwise freedom, torsion of the sleeves permitting angular movement of the spindle 6. In Fig. 3 the seal is of slightly different sleeves 29b.

In some cases it may be possible to use only the partial sealing effect of sleeve 17b depending from the modified cover ring 17a shown in Fig. 4.

Figure 5:
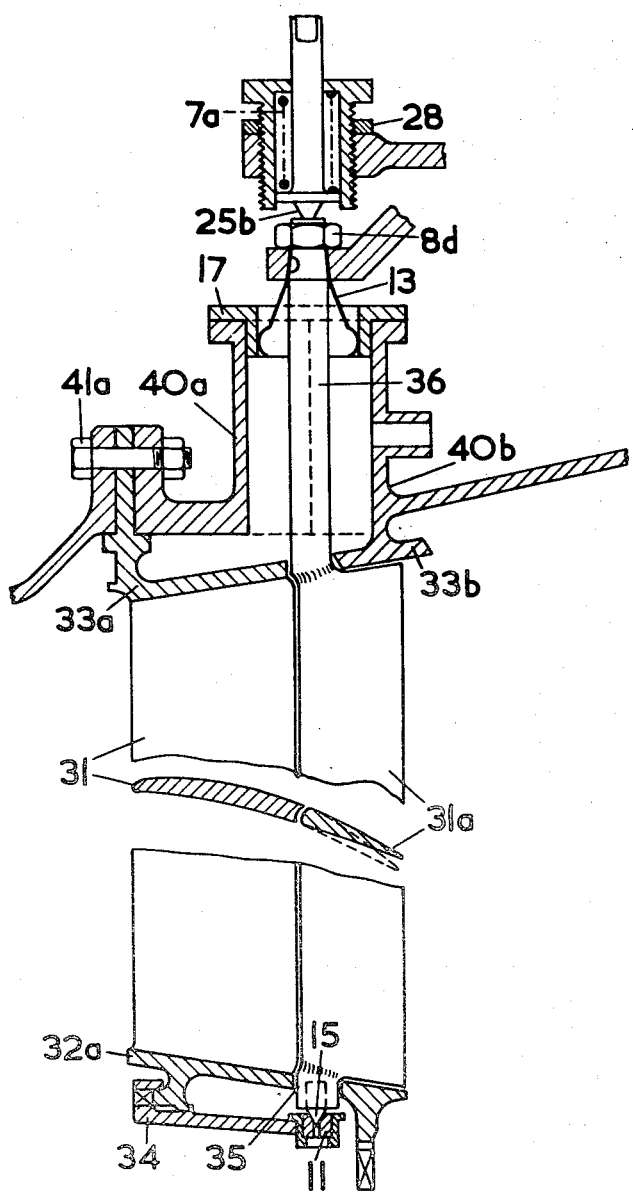
Fig. 5 is a similar view of an interstage guide vane wherein the swivelling element is the trailing edge of the vane.

Fig. 5 shows an arrangement—suitable for an intermediate guide vane between rings of rotor blades—wherein the swivelling element is the trailing edge element 31a moving relatively to the fixed guide element 31 as seen in the conventionally shown section. Guide vanes 31 are integral with rings 32a and 33a forming the inner and outer walls. Ring 32a has holes to pass the inner spindle 35. Ring 33b with ring 33a completes the outer split-ring wall, with holes passing the outer spindles 36. The spindles are formed integrally with the swivelling element 31a. Mounted on ring 32a is the inner bearing support ring 34 carrying footstep bearing arrangements as in Fig. 1. The spindle 36 passes through a hole in the split outer bearing ring member made up of halves 40a and 40b, the former fastened by nuts and bolts 41a to the member 41 of the stator frame construction, to which also is fixed the ring 33a. The outer bearing is as already described with reference to Fig. 4 and the seal is of the form described with reference to Fig. 1. For simplicity the actuating mechanism, which is as already described, is not shown.

I claim:

1. An axial flow elastic fluid turbine comprising inner and outer boundary walls defining between them an annular flow path for the fluid; a swivelling assembly comprising a guide vane element extending across said path between said walls and inwardly and outwardly extending spindles rigidly attached to the inner and outer ends respectively of said element, said walls being formed with apertures through which the spindles protrude; an inner supporting member radially within said inner wall and an outer supporting member radially without said outer wall, said members being screened from said flow path by said walls; a footstep bearing mounted in said inner supporting member and spaced radially inwardly from said inner boundary wall, said inner spindle being supported at its radially inner end in said footstep bearing; a further bearing mounted in said outer supporting member and spaced radially outwardly from said outer boundary wall, said outer spindle being supported in said further bearing; and resilient loading means engaging with said swivelling assembly in a sense to load it towards said footstep bearing.

2. A turbine according to claim 1 wherein said footstep bearing comprises a footstep and said inwardly extending spindle is formed at its radially inner end with a pivot engaging with said footstep.

3. A turbine according to claim 2 wherein said pivot is of a refractory material.

4. A turbine according to claim 1 wherein said footstep bearing comprises a footstep and a single central ball resting on said footstep, said inwardly extending spindle engaging with said ball.

5. A turbine according to claim 1 wherein said footstep bearing is a ball thrust bearing, said inwardly extending spindle being supported in said bearing.

6. A turbine according to claim 1 comprising a seal for preventing leakage from said flow path through one of said apertures.

7. A turbine according to claim 1 comprising a seal in the form of an axially and torsional flexible bellows made up of a series of nested thin metal sleeves coaxial with one of said spindles, the outer sleeve being secured at one end to said spindle, the inner sleeve being secured at one end to the boundary wall through which said spindle protrudes and each intermediate sleeve being secured at one end to the sleeve within it and at the other end to the sleeve enveloping it.

8. An axial flow elastic fluid turbine comprising inner and outer boundary walls defining between them an annular flow path for the fluid through the turbine; a swivelling assembly comprising a guide vane element extending across said path between said walls and an inwardly extending spindle rigidly attached to the radially inner end of said element; an inner supporting member radially within said inner wall, said member being screened from said flow path by said wall; a footstep bearing mounted in said inner supporting member and spaced inwardly from said inner wall, said spindle being supported at its radially inner end in said bearing; and resilient loading means engaging with said swivelling assembly in a sense to load it towards said bearing.

9. An axial flow elastic fluid turbine comprising inner and outer boundary walls defining between them an annular flow path for the fluid; a swivelling assembly comprising a guide vane element extending across said path between said walls and inwardly and outwardly extending spindles rigidly attached to the inner and outer ends respectively of said element; a footstep bearing radially within said flow path, said inner spindle being supported at its radially inner end in said footstep bearing; a further bearing radially without said flow path, said outer spindle being supported in said further bearing; and resilient loading means engaging with said swivelling assembly in a sense to load it towards said footstep bearing, said further bearing being mounted for movement with said outer spindle axially thereof and said resilient loading means engaging with said further bearing in a sense to load it for said footstep bearing.

10. An axial flow elastic fluid turbine comprising inner and outer boundary walls defining between them an annular flow path for the fluid through the turbine; a guide vane element extending across said path between said walls, said element comprising a fixed leading part and a swivelling trailing part, said swivelling part comprising an inwardly extending spindle rigidly attached thereto at its radially inner end; a supporting member attached to the radially inner end of said fixed part; a footstep bearing mounted in said supporting member radially within said flow path, said spindle being supported at its radially inner end in said bearing; and resilient loading means engaging with said swivelling part in a sense to load it towards said footstep bearing.

11. An axial flow elastic fluid turbine comprising inner and outer boundary walls defining between them an annular flow path for the fluid; a swivelling guide vane element extending across said path between said walls and comprising inwardly and outwardly extending spindles at its inner and outer ends respectively, said walls being formed with apertures through which the spindles protrude; an inner supporting member radially within said inner wall and an outer supporting member radially without said outer wall, said members being screened from said flow path by said walls; a footstep bearing mounted in said inner supporting member and spaced radially inwardly from said inner boundary wall, said inner spindle being supported at its radially inner end in said footstep bearing; a ball bearing spaced radially outwardly from said outer boundary wall and comprising inner and outer races, the inner race being secured to said outer spindle and the outer race being mounted for sliding movement in said outer supporting structure axially of the spindle; and resilient loading means engaging with the outer race in a sense to load it towards the footstep bearing.

12. An axial flow elastic fluid turbine comprising inner and outer boundary walls defining between them an annular flow path for the fluid; a swivelling assembly comprising a guide vane element extending across said path between said walls and inwardly and outwardly extending spindles rigidly attached to the inner and outer ends respectively of said element, said wall being formed with apertures through which the spindles protrude; an inner supporting member radially within said inner wall and an outer supporting member radially without said outer wall, said members being screened from said flow path by said walls; a footstep bearing mounted in said inner supporting member and spaced radially inwardly from said inner boundary wall, said inner spindle being supported at its radially inner end in said footstep bearing; a further bearing mounted in said outer supporting member and spaced radially outwardly from said outer boundary wall, said outer spindle being supported in said further bearing; resilient loading means engaging with said swivelling assembly in a sense to load it towards said footstep bearing; and a seal in the form of a thin flexible metal sleeve coaxial with one of said spindles and secured thereto at its end remote from said flow path and engaging at its other end in the aperture through which said spindle protrudes.

13. An axial flow elastic fluid turbine comprising inner and outer boundary walls defining between them an annular flow path for the fluid; a swivelling guide vane element extending across said path between said walls and comprising inwardly and outwardly extending spindles at its inner and outer ends respectively, said walls being formed with apertures through which the spindles protrude; an inner supporting member radially within said inner wall and an outer supporting member radially without said outer wall, said members being screened from said flow path by said walls; a footstep bearing mounted in said inner supporting member and spaced radially inwardly from said inner boundary wall, said inner spindle being supported at its radially inner end in said footstep bearing; a further bearing spaced radially outwardly from said outer boundary wall and comprising two cooperating members, one secured to the outer spindle and the other being mounted for sliding movement relative to said outer supporting structure axially of the spindle; and resilient loading means engaging with said other member in a sense to load it towards the footstep bearing.

14. An axial flow elastic fluid turbine comprising inner and outer boundary walls defining between them an annular flow path for the fluid; a swivelling guide vane element extending across said path between said walls and comprising inwardly and outwardly extending spindles at its inner and outer ends respectively, said walls being formed with apertures through which the spindles protrude; an inner supporting member radially within said inner wall and an outer supporting member radially without said outer wall, said members being screened from said flow path by said walls; a footstep bearing mounted in said inner supporting member and spaced radially inwardly from said inner boundary wall, said inner spindle being supported at its radially inner end in said footstep bearing; a further bearing spaced radially outwardly from said outer boundary wall, said outer being supported in said further bearing, and said further bearing being mounted in said outer supporting member for movement therein with said outer spindle axially thereof; and resilient loading means engaging with said further bearing in a sense to load it towards said footstep bearing.

15. An axial flow elastic fluid turbine comprising inner and outer boundary walls defining between them an annular flow path for the fluid; a swivelling guide vane element extending across said path between said walls and comprising inwardly and outwardly extending spindles at its inner and outer ends respectively, said walls being formed with apertures through which the spindles protrude; an inner supporting member radially within said inner wall and an outer supporting member radially without said outer wall, said members being screened from said flow path by said walls; a footstep bearing mounted in said inner supporting member and spaced radially inwardly from said inner boundary wall, said inner spindle being supported at its radially inner end in said footstep bearing; a sliding member mounted in said outer supporting member for sliding movement therein coaxially with said outer spindle, the sliding member and the outer spindle being formed at their adjacent ends one with a pivot and the other with a socket in which the pivot engages; and resilient loading means engaging with said sliding member in a sense to load it towards said footstep bearing.

16. An axial flow elastic fluid turbine comprising inner and outer boundary walls defining between them an annular flow path for the fluid through the turbine; an inner supporting member radially within said inner wall and an outer supported member radially without said outer wall, said members being screened from said flow path by said walls; a turbine guide vane extending across said path between said walls and comprising a fixed forward part rigidly attached at its ends to said supporting members; a swivelling assembly comprising an element extending across said path between said walls, said element constituting the trailing part of said guide vane, and inwardly and outwardly extending spindles rigidly attached to said element at its inner and outer ends respectively, said walls being formed with apertures through which said spindles protrude; a footstep bearing mounted in said inner supporting member and spaced radially inwardly from said inner boundary wall, said inner spindle being supported at its radially inner end in said footstep bearing; a further bearing mounted in said outer supporting member and spaced radially outwardly from said outer boundary wall, said outer spindle being supported in said further bearing; and resilient loading means engaging with said swivelling assembly in a sense to load it towards said footstep bearing.

References Cited in the file of this patent

UNITED STATES PATENTS

| | | |
|---|---|---|
| 2,300,766 | Baumann | Nov. 3, 1942 |
| 2,337,861 | Adamtchik | Dec. 28, 1943 |
| 2,651,492 | Feilden | Sept. 8, 1953 |
| 2,651,496 | Buckland et al. | Sept. 8, 1953 |
| 2,671,634 | Morley | Mar. 9, 1954 |